United States Patent
Moreno Bustamante et al.

(10) Patent No.: US 12,552,647 B2
(45) Date of Patent: Feb. 17, 2026

(54) HOIST APPARATUS COMPRISING A MONITORING DEVICE AND MANAGEMENT SYSTEM USING THE HOIST APPARATUS

(71) Applicant: TRACTEL INC., Norwood, MA (US)

(72) Inventors: César Augusto Moreno Bustamante, Benito Juárez (MX); Arturo García Aguirre, Iztacalco (MX)

(73) Assignee: TRACTEL INC., Norwood, MA (US)

( * ) Notice: Subject to any disclaimer, the term of this patent is extended or adjusted under 35 U.S.C. 154(b) by 1421 days.

(21) Appl. No.: 17/260,823

(22) PCT Filed: Jul. 16, 2018

(86) PCT No.: PCT/IB2018/055251
§ 371 (c)(1),
(2) Date: Jan. 15, 2021

(87) PCT Pub. No.: WO2020/016625
PCT Pub. Date: Jan. 23, 2020

(65) Prior Publication Data
US 2021/0292139 A1    Sep. 23, 2021

(51) Int. Cl.
*B66D 3/26* (2006.01)
*H04W 4/029* (2018.01)
*B66D 3/20* (2006.01)

(52) U.S. Cl.
CPC .............. *B66D 3/26* (2013.01); *H04W 4/029* (2018.02); *B66D 3/20* (2013.01)

(58) Field of Classification Search
CPC ................................ B66D 3/26; H04W 4/029
(Continued)

(56) References Cited

U.S. PATENT DOCUMENTS

| 4,636,962 A | 1/1987 | Broyden et al. |
| 8,988,020 B1* | 3/2015 | Rometo ................. H01H 33/36 |
| | | 318/268 |

(Continued)

FOREIGN PATENT DOCUMENTS

| CA | 2 757 159 | 3/2010 |
| CN | 103744021 | 4/2014 |

(Continued)

OTHER PUBLICATIONS

International Search Report for PCT/IB2018/055251 dated Dec. 6, 2018, 3 pages.

(Continued)

*Primary Examiner* — Erick D Glass
(74) *Attorney, Agent, or Firm* — NIXON & VANDERHYE

(57) ABSTRACT

Disclosed is a hoist apparatus including: an electric motor, and a control box that can be electrically powered by a power supply, the control box including at least an electronic control circuit, an electrical wiring and an external casing forming a box of the control box, the external casing including at least sidewalls and a removable lid closing the box, the control box controlling the operations of the electric motor thanks to the electrical wiring connected to the electronic control circuit, to the power supply and to the electric motor, and a monitoring device, wherein the monitoring device is an insert of the box, the monitoring device being arranged within an enclosure, the enclosure being an added part of the box or being an exchanged part of the box and wherein the monitoring device is connected to the electrical wiring.

16 Claims, 3 Drawing Sheets

Figure 4:
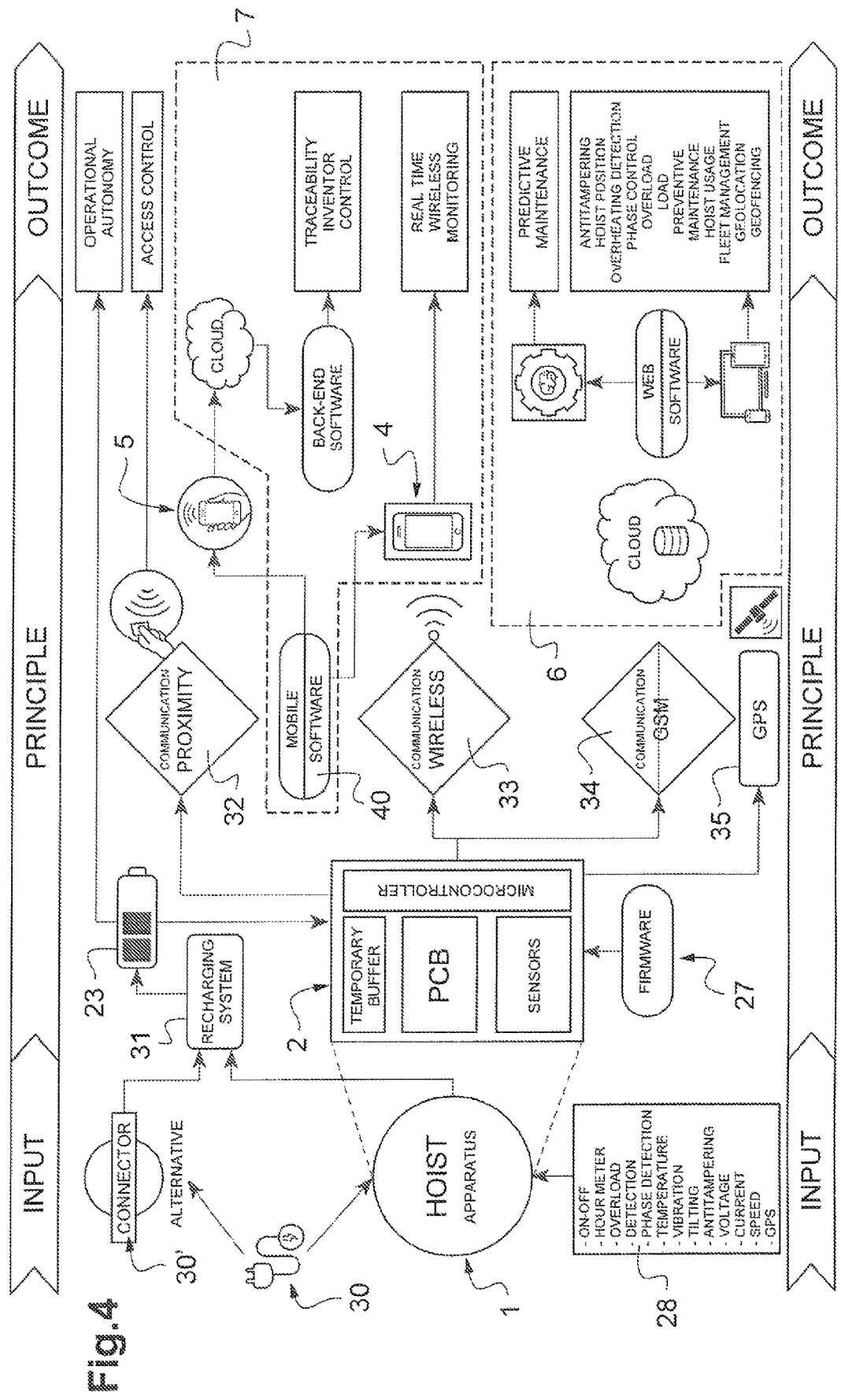

(58) Field of Classification Search
USPC .......................................................... 187/393
See application file for complete search history.

(56) References Cited

U.S. PATENT DOCUMENTS

| | | |
|---|---|---|
| 2003/0205703 A1 | 11/2003 | McCormick et al. |
| 2004/0094366 A1 | 5/2004 | Weinberger et al. |
| 2011/0121247 A1 | 5/2011 | Houser et al. |
| 2011/0278100 A1* | 11/2011 | Bonanno ................. H02P 27/06 |
| | | 187/296 |
| 2012/0138392 A1* | 6/2012 | Anasis ................. B66D 1/7489 |
| | | 187/298 |
| 2016/0130114 A1* | 5/2016 | Wilke ................... B66B 5/0025 |
| | | 187/393 |
| 2023/0076909 A1* | 3/2023 | Beckmann .............. B66C 13/44 |

FOREIGN PATENT DOCUMENTS

| | | |
|---|---|---|
| CN | 206624530 U | 11/2017 |
| EP | 2 840 052 | 2/2015 |
| WO | 2016/159128 | 10/2016 |

OTHER PUBLICATIONS

Written Opinion of the ISA for PCT/IB2018/055251 dated Dec. 6, 2018, 7 pages.

* cited by examiner

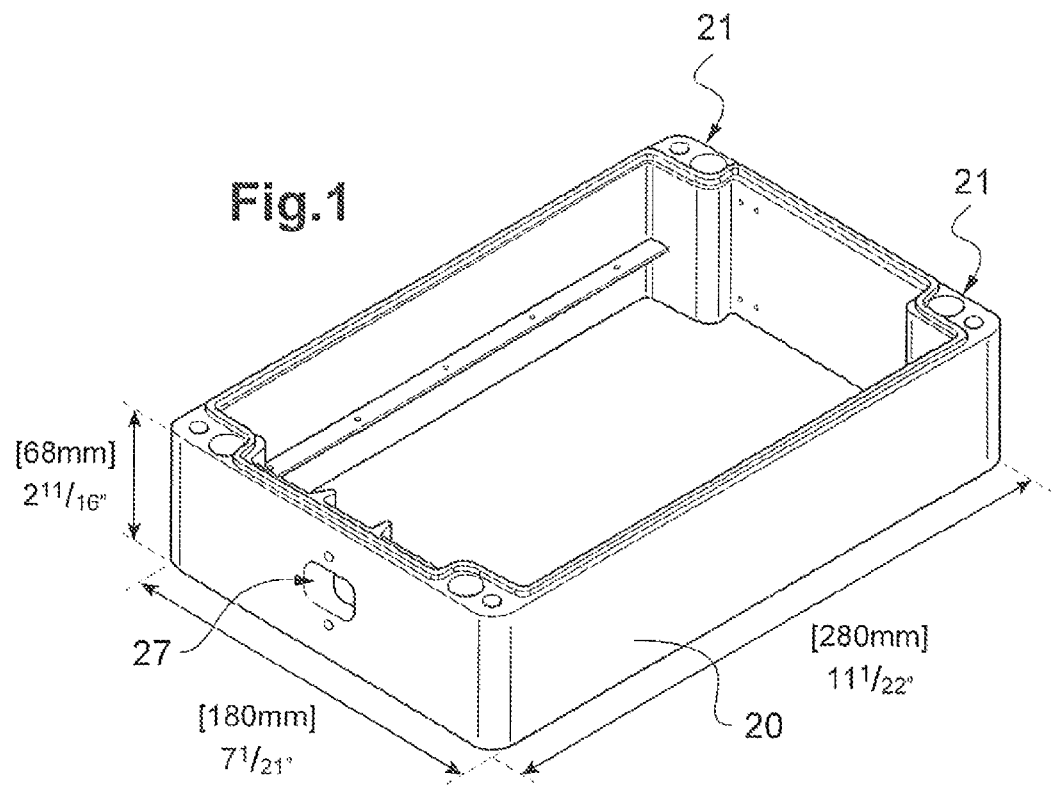
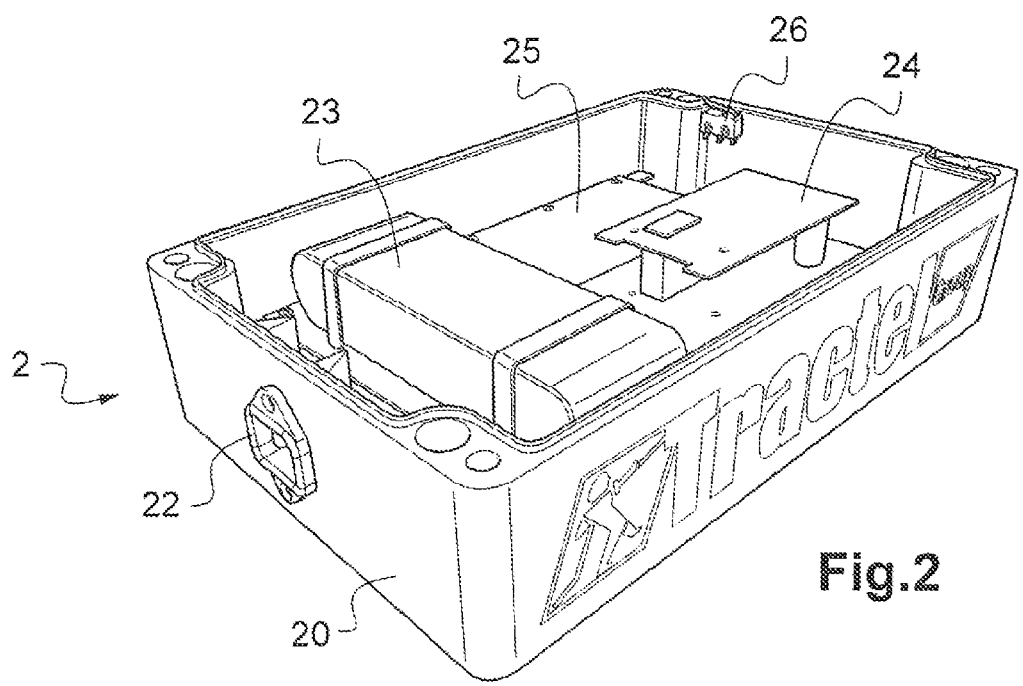

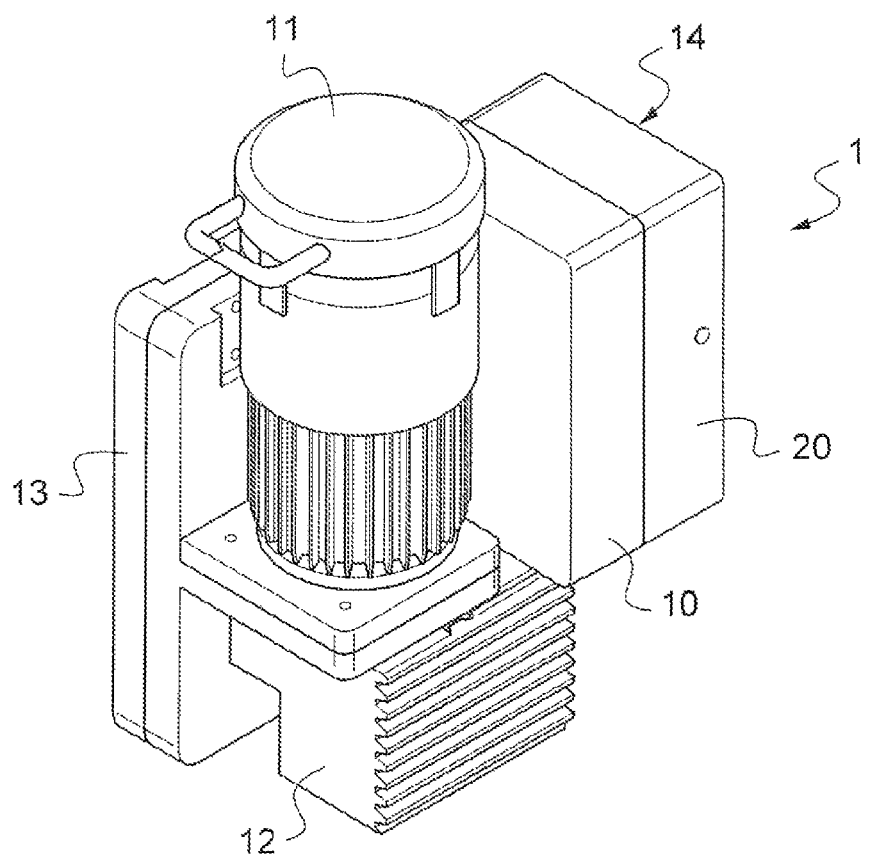

HOIST APPARATUS COMPRISING A MONITORING DEVICE AND MANAGEMENT SYSTEM USING THE HOIST APPARATUS

CROSS-REFERENCE TO RELATED APPLICATIONS

This application is the U.S. national phase of International Application No. PCT/IB2018/055251 filed Jul. 16, 2018 which designated the U.S., the entire contents of each of which is hereby incorporated by reference.

TECHNICAL FIELD OF THE INVENTION

The invention relates to a hoist apparatus comprising a monitoring device and a management system using the hoist apparatus. It has applications in the field of the electrical hoist apparatuses.

BACKGROUND INFORMATION AND PRIOR ART

As it is now, the hoist apparatuses operate mainly as black boxes that offer little information to their users about their performance and current state of functionality. When a user is operating a hoist apparatus it is possible for him to know that it works or not, but it's not possible for him to know if its operation is efficient or event optimal. This is even worse for remote persons who may be responsible for the management of the hoist apparatus as there is no possibility of remote communication.

Also, unless the hoist apparatus stops working or it has a scheduled service, is hard to know if a maintenance is required to maintain it, improve its performance or to extend the life of the product.

In order to optimize maintenance, it is preferable to monitor the operations of the hoist apparatuses and thus to extract data from the operation of the hoist and analyze the extracted data.

Numerous documents describe devices and methods in relation to the control and monitoring of activities of electrical hoist apparatuses and following documents may be cited: CA2757159A1, WO2016159128A1, CN103744021A, U.S. Pat. No. 4,636,962A, US2003205703A1, US2011121247A1.

However, the related control and monitoring functionalities are entangled from the start in the apparatuses and they cannot be simply used in existing hoist apparatus that does not have monitoring functionalities.

SUMMARY OF THE INVENTION

Therefore, it would be useful to be able to add monitoring functionalities to existing hoist apparatuses that does not have such monitoring functionalities in a simple way. It would also be useful to be able to remove from the hoist apparatus the monitoring functionalities in the case they are no more required and to be able to continue to use the hoist apparatus as before the installation of the monitoring functionalities. It would also be useful to be able to install, swap or exchange, remove or even upgrade the device providing the monitoring functionalities easily and without degrading the future operations of the hoist apparatus and without degrading the characteristics of the hoist apparatus for example as regards electrical security, tightness, EMC . . . .

In its basic principle, the invention relates to an extension device that is adapted to and connected to the electrical control box of an existent hoist apparatus to enable its remote monitoring and geolocation. The extension device that is a monitoring device is optional and it can be easily installed, exchanged and possibly removed in/from the hoist apparatus, and in that last case, the hoist apparatus regaining an initial configuration without the monitoring device. In its preferred implementation and simpler implementation, it is a passive device in that it operates without controlling any function of the hoist apparatus. In all case it does not degrade the performances of the hoist apparatus.

The above objects are achieved according to the invention by providing a hoist apparatus comprising:
  an electric motor,
  a control box that can be electrically powered by a power supply, the control box comprising at least an electronic control circuit, an electrical wiring and an external casing forming a box of the control box, said external casing comprising at least sidewalls and a removable lid closing the box, the control box controlling the operations of the electric motor thanks to the electrical wiring connected to the electronic control circuit, to the power supply and to the electric motor, and
  a monitoring device, in which the monitoring device is an insert of the box, the monitoring device being arranged within an enclosure, the enclosure being an added part of the box or being an exchanged part of the box and wherein the monitoring device is connected to the electrical wiring.

In the following text, the wording "sidewalls" and "peripheral walls" is used in plural tense for the case the control box is of parallelepipedal shape, the lid being rectangular, square, polygonal . . . , and thus having a plurality of walls but the invention applies also in the case the control box is cylindrical, the lid being circular, and thus having a continuous circular wall around it.

In various embodiments of the invention, the following means, which can be used alone or in any technically possible combination, are also used:
  the enclosure is an added part of the box and the monitoring device is arranged within an enclosure having at least peripheral walls, the enclosure being sandwiched between the lid and the sidewalls of the box, the enclosure being shaped for the peripheral walls being in the continuation of shape of the sidewalls,
  the enclosure is an exchanged part of the box and the monitoring device is arranged within an enclosure that forms a new the lid of the box,
  the monitoring device is connected to electrical inputs and/or outputs of the control box,
  the control box comprises safety relays and the monitoring device is connected to the existent safety relays of the control box,
  the monitoring device is a plug and play device that is removable from the box,
  the box with or without the monitoring device is a closed box, except for the electrical wiring connected externally to the power supply and to the electric motor,
  the electric motor comprises sensors and/or detectors,
  the enclosure is in molded plastic,
  the enclosure is metallic,
  the enclosure is shielded against radiofrequency,
  the enclosure is shielded against electromagnetic waves and perturbations,
  the box is in molded plastic,
  the box is metallic, the electric motor is earthed,
the box is earthed,
the lid is earthed,
the enclosure is earthed,
the electrical wiring has an internal part that is located within the control box and the monitoring device is connected to the internal part of the electrical wiring,
the external casing further comprises a bottom,
the monitoring device comprises the enclosure,
the enclosure of the monitoring device is removable from the control box,
the monitoring device with its enclosure is provided as a kit to install on an unequipped hoist apparatus,
the enclosure of the monitoring device is installed on an unequipped hoist apparatus, sandwiched between the lid and the sidewalls of the control box,
the enclosure on its own is waterproof,
the enclosure on its own is dustproof,
the control box with the enclosure sandwiched in it is waterproof,
the control box with the enclosure sandwiched in it is dustproof,
the monitoring device comprises:
  means of communication allowing at least the transmission of information,
  means for collecting data,
  means for comparing at least some of the data to reference values,
  means for executing actions according to the result of the comparison, said actions being at least to allow the transmission of information,
the information comprise data,
the means of communication is a wireless circuit,
the means of communication is a powerline communication system, information being transmitted by a modulation on the power supply,
the monitoring device comprises means to discern some of the data collected,
the monitoring device comprises embedded sensors and/or detectors,
the monitoring device comprises integrated sensors and/or detectors,
the detectors of the monitoring device allow at least one of the following operations: measuring voltage, current, temperature, vibrations, hours of use, discerning ascending and descending movements, hoist tilting,
the monitoring device comprises following elements:
  a programmed computing device,
  a real clock timer providing time data,
  a circuit to detect the presence and absence of the power supply and provide related data, a circuit to detect the operations of the electric motor and provide related data,
  a circuit to detect the movements of the hoist apparatus and provide movement data,
  a geo location device to provide geolocation data,
  a memory circuit to memorize data, said memorized data being at least data in relation to the presence of the power supply and to the operations of the electric motor, at least some of said data being time stamped by the time data of the real clock timer, said memory circuit being readable,
  a wireless circuit for the means of communication, said wireless circuit allowing at least the transmission of information, said information being at least datum or data provided by the elements of the monitoring device and/or memorized datum or data, and in that the programmed computing device is configured to compare at least some of the data to reference values and to execute actions according to the result of the comparison, said actions being at least to allow the transmission of information,
the monitoring device comprises an identification circuit providing an identification reference that is unique,
at least some of the data is identification reference stamped,
the data in relation to the operations of the electric motor are at least the direction of rotation, the speed of rotation,
at least some of the data is geolocation stamped by the geo location device,
the elements of the monitoring device are comprised within the enclosure,
some parts of the elements of the monitoring device are comprised outside the enclosure, notably antenna(s) and/or detector(s) such as luminous detectors,
the circuit to detect the presence and absence of the power supply is electrically connected to the wiring,
the circuit to detect the presence and absence of the power supply that is electrically connected to the wiring further allows voltage measurements for providing power supply voltage data,
the circuit to detect the presence and absence of the power supply is electromagnetically connected to the wiring and galvanically isolated from the wiring, said circuit comprising at least one current transformer,
the circuit to detect the operations of the electric motor is electrically connected to the wiring,
the circuit to detect the operations of the electric motor that is electrically connected to the wiring further allows voltage measurements for providing motor supply voltage data,
the circuit to detect the operations of the electric motor is electromagnetically connected to the wiring and galvanically isolated from the wiring, said circuit comprising at least one current transformer,
the monitoring device is powered by the power supply through a galvanic isolation device using an electromagnetic transformer,
the monitoring device is backed-up by a rechargeable battery,
means for communication and notably the wireless circuit are further able to receive instructions to command the programmed computing device of the monitoring device,
a command of the programmed computing device is for sending information
the wireless circuit is near field for local/proximity communication,
the wireless circuit is for remote communication, preferably through a communication network,
the wireless circuit is of the mobile phone type and/or of the proximity communication type,
the wireless circuit is at least one of the GSM, WIFI, BLUETOOTH, NFC . . . types,
the memory circuit is a read/write memory,
the at least a part of the memory circuit is of the erasable type,
the at least a part of the memory circuit is of the non-erasable type,
the memory circuit is an EEPROM,
the memory circuit is a FLASH® memory,
the programmed computing device of the monitoring device comprises a microcontroller, the monitoring device comprises an over-the-air upgradable microcontroller, the monitoring device comprises an over-the-air upgradable memory program of the programmed computing device, the circuit to detect the movements of the hoist apparatus is selected from an accelerometer and/or the use of geolocation data provided by the geolocation device, a change of the geolocation data over the time providing a detection of movement, the hoist apparatus comprises a plurality of accelerometers, at least one accelerometer is used to activate the geolocation and transmit other data of the hoist apparatus, at least one accelerometer is used to detect abnormal vibrations of the hoist apparatus and notably its mechanical components, at least one accelerometer is used to detect any abnormal tilting when the hoist apparatus is used for suspended platforms, the programmed computing device is configured to compare a current geolocation data to geolocation reference values corresponding to points of a virtual fence around an authorized location of the hoist apparatus and to allow the transmission of an information that is an overfence alarm when the current location is outside the virtual fence, the monitoring device further comprises one or more of the following elements:

a tampering detector providing tampering data in case the lid is opened and the programmed computing device is configured to allow the transmission of an information that is a tampering alarm when the lid is opened, a removal detector providing removal data in case the monitoring device is removed from the control box, and the programmed computing device is configured to allow the transmission of an information that is a removing alarm when the monitoring device is removed, a tilting detector providing tilting data in case the hoist apparatus is tilted over a maximum angle of tilting, and the programmed computing device is configured to allow the transmission of an information that is a tilting alarm when the hoist apparatus is tilted over the maximum angle of tilting, a vibration detector providing vibration data and the programmed computing device is configured to allow the transmission of an information that is a vibration alarm when the vibration data is over a vibration reference value, a circuit to detect the presence and absence of the power supply further measuring voltage and/or current and provide related data, a circuit to detect the operations of the electric motor further measuring voltage and/or current and provide related data, a proximity communication device, a thermometer to detect the temperature of the electric motor case and provide related data, the proximity communication device is a NFC sensor, the detectors of the monitoring device comprise anti-tampering switches, the monitoring device further comprises a luminous detector, notably a photodetector, a still shot camera, a video camera, the monitoring device further comprises an audio circuit comprising at least a loudspeaker, the monitoring device further comprises a two-ways audio for IP communication, the monitoring device further comprises a voiceover command for audio monitoring of the most important measurements, the control box is further connected to an electric command line terminated with a pendant command panel allowing an operator to select operations of the hoist apparatus and the monitoring device is connected to the electric command line and the monitoring device further comprises a circuit to detect the operations selected by the operator on the pendent command panel and provide related data, the command line has an internal part that is located within the control box and the monitoring device is connected to the internal part of the command line, the electronic control circuit of the control box comprises input/output connecting blocs connected to the wiring and the monitoring device is connected/wired to the input/output connecting blocs, the monitoring device is passive in that it does not control the operation of the hoist apparatus, so that a dysfunction or a non-function of the monitoring device does not disturb the operation of the hoist apparatus, the monitoring device is passive in that it does not control, does not disable and does not improve or modify any performance of the hoist apparatus, mechanically or electrically, in an advanced active implementation of the monitoring device, the programmed computing device is further configured to allow to disable the operation of the hoist apparatus by acting on the command line, in an advanced active implementation of the monitoring device, the programmed computing device is further configured to disable the operation of the hoist apparatus when the comparisons of the data are significative of an abnormal condition of the hoist apparatus, The invention is also related to a monitoring device specifically configured for the hoist apparatus of the invention, said hoist apparatus comprising an electric motor and a control box that can be electrically powered by a power supply, the control box comprising an electronic control circuit, an electrical wiring and an external casing forming the box of the control box, said external casing comprising at least sidewalls and a removable lid closing the box, the control box controlling the operations of the electric motor thanks to the electrical wiring connected to the electronic control circuit, to the power supply and to the electric motor, in that the monitoring device is arranged within an enclosure having at least peripheral walls, the enclosure being configured to be sandwiched between the lid and the sidewalls of the box, the enclosure being shaped for the peripheral walls being in the continuation of shape of the sidewalls, and in which the monitoring device is configured to be connected to the electrical wiring.

The invention is also related to a process for installation of a monitoring device as described in an unequipped hoist apparatus, said hoist apparatus comprising an electric motor and a control box that can be electrically powered by a power supply, the control box comprising an electronic control circuit, an electrical wiring and an external casing forming the box of the control box, said external casing comprising at least sidewalls and a removable lid closing the box, the control box controlling the operations of the electric motor thanks to the electrical wiring connected to the electronic control circuit, to the power supply and to the electric motor, in which process the monitoring device is arranged within an enclosure having at least peripheral walls, and if the lid of the box is not removed from the box, then the lid is removed from the box to have an opened box, the enclosure is arranged on the opened box, the monitoring device is connected to the electrical wiring and the lid is then arranged on the enclosure in order to have the enclosure sandwiched between the lid and the sidewalls of the box, the peripheral walls being in the continuation of shape of the sidewalls.

In a variant, the enclosure of the monitoring device is sandwiched in the control box and the whole is then arranged and wired on the electric motor.

The invention is also related to a management system comprising a set of hoist apparatuses as described, at least a server on a cloud that can communicate with the hoist apparatuses and a management application/software. The software applications that may be used with the invention are implemented as stored instructions of a process to be executed in a controller or microprocessor. The instructions are stored in a material memory of a related computing device.

More generally, the management system for hoist apparatuses comprises a set of hoist apparatuses as described, a server with a user software and connected to a network over which the monitoring device can exchange data with the server, the monitoring device of each hoist apparatus comprising an identification circuit providing an identification reference that is unique to each hoist apparatus, the identification reference being transmissible by the hoist apparatus, the user software using identifications, data and information transmitted by the monitoring devices.

The user software processes the identifications, data and information transmitted by the monitoring devices. The network is selected from INTERNET, the industrial, scientific and medical (ISM) radio bands and near-field/proximity communication.

The transmission of the identifications, data and information is done through Internet to a cloud platform.

In some embodiments, the data, information and identification is/are transmitted to a cloud server in data packets using a GSM and/or satellite router(s).

In some embodiments, the data, information and identification is/are transmitted with the use of wireless and proximity technology to the operator's mobile devices, including a near field/proximity communication to enable an access key and identification for fleet managing purposes.

The management system further comprises at least one remote computer device, typically a smart phone, a tablet or a portable computer, that is connectable to the network and being able to receive at least part of the processed identifications, data and information from the server.

In some embodiments, the remote computer device is connectable directly to the network and/or the remote computer device is connectable to the network through the hoist apparatus. The monitoring device then further comprising means to create a point of access to the network for the remote computer. In some embodiments, the remote computer comprises software to access directly to the memory of the monitoring device.

SHORT DESCRIPTION OF THE FIGURES

The appended figures will allow a good understanding of how the invention may be implemented. In these figures, same references designate similar elements. In addition, further advantages of the invention will become apparent in relation to the figures, in which:

FIG. 1 is a perspective view of an empty enclosure of the monitoring device that can be installed in the control box of a hoist apparatus, FIG. 2 is a perspective view of the monitoring device that can be installed in the control box of a hoist apparatus, FIG. 3 is a view of a hoist apparatus in which a monitoring device has been installed in the control box of the hoist apparatus, and FIG. 4 is a schematic representation of the hardware, software, functions and relations of the elements that may be applied to a management system using a hoist apparatus equipped with the monitoring device.

DETAILED DESCRIPTION OF EXAMPLE(S)

In this document, the trademarks, for example GSM, WIFI, BLUETOOTH, NFC . . . , that are mentioned belong to their owners.

The monitoring device can be installed in the box of the electric control box of an existing hoist apparatus without any coupling or adaptation into the gearbox, pulley system, or mechanical system.

The monitoring device does not only provide data directly related with the operations and performance of the electrical hoist apparatus, like voltage, current, vibration, temperature, working hours and other valuable information but the data is also sent remotely to a communication network, more specifically to the cloud, to be analyzed through machine learning and other smart technologies that lead to predictive maintenance for the hoist apparatuses. It also allows a more efficient management of the different hoist apparatuses because the monitoring device also provides other type of data related to the identification and management of each hoist, like its geolocation, serial number, users assigned and other valuable information. Thanks to that, it is possible for a remote manager to map and to manage the complete fleet of hoist apparatus and to know their serial numbers, type of hoist, history, location within defined limits, users, maintenance technicians, etc.

Thanks to the monitoring device attached to the control box of the hoist apparatus, a variety of detectors/sensors can be used to obtain operational and non-operational data, identification and information that can be sent through diverse digital means of communication to remote server(s), preferably on the cloud, where they are analyzed using machine learning and other artificial intelligence technologies that lead to predictive maintenance. Thanks to the means of the monitoring device and to the remote means to which it communicates, it is possible to do preventive, from measured data, and predictive maintenance, from data analysis. The monitoring device, thanks to its physical and structural shape, can be integrated and fitted to the electrical control box of hoist apparatus, new or in operation, without modification, to monitor the hoist apparatus remotely. Moreover, thanks to the structure of detector circuits used in the monitoring device, the connection to the electrical wiring of the control box is simplified because the connections are mostly in parallel of the electrical wiring of the control box, on the input and output (I/O) electrical ports. Some other connections to the electrical wiring of the control box may be in series on some I/O ports but this is generally limited to current detection or, in an active monitoring device, for controlling some operations of the hoist apparatus. Note that in this last case, some control of operations can be done with a parallel connection in case a pulldown or pullup is sufficient on an electric control line that allows it. The monitoring device integrates a variety of detectors and sensors on a printed circuit board to collect data. Thanks to a programmed microcontroller the monitoring device is able to detect any situation out of the expected nominal ranges and to warn locally and remotely. The remote communication is done through wireless means of communication to mobile devices in real time and the content of the communication can be stored in the cloud for machine learning.

In fact, the monitoring device can be implemented in many ways. In a simple implementation, the monitoring device is monitoring the hoist's most common electrical features without any control of any functionality of them and there is no interface or operator's control station because the monitoring device is not controlling any function, but for monitoring and geo-tracking the hoist apparatus, in that sense it is passive in such a simple implementation. Such a monitoring device that is added to the box of the electric control box of the hoist apparatus enable the remote monitoring of the most important electrical features and for geo-location of the hoist apparatus, without controlling any of its functions or changing its performances.

Even with such a simple implementation, it is possible to do remote monitoring and geo-tracking of the running state of the electric motor of hoist apparatuses in order to help the operator to connect the hoist correctly, the supervisor and fleet managers to track the hoist and supervisors to assign authorization cards and ID parameters without detecting any fault.

In a more advanced embodiment, in which the monitoring device is active in that sense it can control the operation of the hoist apparatus, it can have an access key to activate the electrical hoist through digital means. It is then possible, in this more advanced embodiment, to manage the authorizations for the operations of the hoist apparatus through proximity technology to provide a way to control if a company decides that only authorized people will be able to activate the device using proximity technology such as NFC® of a mobile phone.

The monitoring device has operational autonomy if there's no electrical energy because it owns a rechargeable battery and, possibly, a supplementary backup non-rechargeable battery.

The monitoring device adds at least the following functionalities/capabilities to a hoist apparatus: remote monitoring, geolocation, geofencing, general ID information, hour counter, amperage, voltage, overload and tampering alarm.

The monitoring device is enclosed in an enclosure that is an extension of the box of the control box of the hoist apparatus. Thanks to the addition of the enclosure to the box of the control box, it is possible to connect directly, within the control box, the electrical wiring to the detectors of the monitoring device. The tightness of the control box, with the enclosure added to it, is preserved.

The monitoring system contains a plurality of components such as a battery, remote communication devices, PCB, wiring, connectors, switches, relays and a proximity communication device such as a NFC® sensor and/or WIFI.

Thanks to the enclosure of the monitoring device, the hoist apparatus equipped with the monitoring device preserves the water resistance, shock resistance, weather hi range. The material used for the enclosure is flame retardant and has UV protection.

In terms of functionalities/capabilities, the monitoring device, possibly in relation with the management system that also operates remotely from the hoist apparatus, allows:

ON-OFF indication and monitoring: Any time the hoist apparatus is connected to a power supply, the system registers the time and date of the event and starts to count how many hours the hoist is plugged on or its general/main switch is ON. Note that this is different from the Hour Meter as the hour-meter is not started with ON but only start to count when and while the hoist apparatus is in operation, that is when it is hoisting.

Hour Meter: When the hoist apparatus starts to operate, the hour meter function will detect how many seconds, minutes and hours the hoist apparatus is going up or down separately. With this function, the user will have a precise record of the operation time in order to schedule the preventive maintenance and nominal capacity certification according to an annual maintenance program.

Launching Accelerometer: If the hoist apparatus is handled or moved for any purpose, the system will send the GPS ("Global Positioning System") location and show the status of the hoist apparatus. This function helps the user to detect non-authorized handlings of the equipment.

Geo Location: The integrated GPS locates the hoist apparatus at any programmed time or by request.

Geo fencing: The user can configure in a map a virtual fence around the hoist apparatus that cannot be crossed. An overfence alarm will appear in the application when the crossing occurs, the application being a computer program that is remotely executed, preferably on the cloud, in a server and/or on a mobile or smart phone, such computer program being possibly shared and/or distributed among different devices such as servers, mobile phones, smart phones, tablets. . . . Such a program can also be implemented in the monitoring device and provide locally, for example, audible overfence warning or alarm.

Anti-Tampering Case: The monitoring device includes two anti-tampering switches that activate an alarm that is transmitted remotely but that can also be generated audibly locally. If the operator opens the cover of the control box of the hoist apparatus, an alarm will appear in the application. If the monitoring device is removed from the hoist apparatus, another alarm will be activated.

Tilting Detection: The system can detect an excessive inclination of the platform or hoist apparatus and activate an alarm, this can be due to an excessive inclination of the hoist apparatus or due to a difference in the operations of the hoist apparatus making the suspending cables having too much difference in their lengths. This is particularly relevant, but not only, when two or more hoist apparatus are operated on one suspended platform.

Vibration Detection: Excessive or specific vibration of the hoist apparatus can be detected and alarmed. The simulations in the hoist apparatus laboratory and the implementation of the machine learning modality of the analyzing software application will be used to determine the present frequencies before a failure, such as: wire deformations, pulley wear, motor malfunctions, overload, shocks, etc. This is the type of measurements that is used for predictive maintenance.

Voltage-Measurements: The monitoring device includes a Voltmeter to measure the difference in electric potential of the power supply of the hoist apparatus remotely. Knowing the voltage may avoid the overheating and forcing of the motor and its electrical components. Using the hoist apparatus under the minimum tolerance of its nominal voltage or exceeding it can cause severe damages to the electric coil of the motor. All those fault conditions can be detected locally, in the monitoring device, and/or remotely and actions can be taken in response.

Amperage Measurements: The measurements of the electric current of the hoist apparatus allows the user to detect any change in the regular heat and to evaluate the performance of the magnetic field of the motor. Moreover, understanding the relation of the Voltage and Amperage with the nominal capacity and the use conditions can help to predict the possible failures of the hoist apparatus.

NFC® KEY: The monitoring device includes a NFC® sensor that restricts the use of the hoist apparatus to authorized operators in active monitoring devices. Authorization process can be done through the monitoring device application to those users that have been certified to operate the hoist apparatus by giving access to mobile or smart phones (provided with NFC® technology) or special cards with NFC® attributes. Competent Operators will be allowed to start the hoist apparatus. More generally, any one or combination of proximity communication devices/sensors may be used such as NFC® and/or WIFI® for example.

Motor Overtemperature Detection: The hoist apparatus by itself has a bimetallic strip switch which stops the motor and avoids its overheating when a defined harmful temperature is reached. This switch is embedded inside the electric coil of the stator winding and connected to the main circuit. An alarm will be configured to indicate that the overtemperature protection is activated. Overtemperature detection can also be considered as a sign of overload.

Overload Detection: Overload can be detected by the electrical performance of the motor combining the values of voltage and current.

Pendant Control Anti-tampering: One of the critical safety incidents in the elevator installation procedure is the non-authorized bypass of the third button of the pendant control that requires the operator to lift or bring down the cradle by pushing two buttons at the same time using two hands and with all the attention. The Anti-tampering function includes a passive switch in the pendant control and a cable transmitter or a wireless solution connected to the monitoring device.

Overheating Alarm: Considering the temperature range specified for the gearbox oils (that uses mineral or synthetic oils) of the hoist apparatus, typically between-35° C. to +80° C., a thermometer can be located at the exterior surface of the stator frame of the electrical motor and connected with an external cable to the monitoring device. All external cables may pass through connection holes of the enclosure of the monitoring device or may be wired in parallel to the wiring from the control box to the field winding of the motor to stay inside of the box.

Phase reversal detection: When the phase sequence of a three-phase hoist apparatus hoist is incorrect, the connected motor runs in the opposite direction. Phase reversal usually occurs as a result of mistakes made during the installation or modifications to the hoist apparatus. The hoist apparatus includes a three-phase monitor relay with a phase reversal protection. The relay will not energize if the phase sequence is reversed and it can stop the motor if the phase reversal occurs during operation. The monitoring device includes an alarm when the phase sequence is reversed, so the operator can make the necessary modifications to the power supply of the hoist apparatus.

Real Time Monitoring: The monitoring device has a BLUETOOTH® communication device that allows the operator to display the most important values of the hoist apparatus performance and alarms status using a mobile device screen with BLUETOOTH®. The authorized operator will need to pair the mobile device with the hoist apparatus. This functionality does not require GSM® data transmission but uses proximity communication such as NFC® or BLUETOOTH®, and it is displayed in real time. More generally, any one or combination of proximity communication devices/sensors may be used such as NFC® and/or WIFI® for example.

Inventory Management: Device Inventory Management Application will help to track the devices from the manufacturing warehouse to the final user. The application associates and links all hoist apparatuses and possibly their components with their serial numbers, batch features, invoices and relevant information of the production. The end user can scan the passive TAG of the monitoring device and get all the ID information even when the monitoring device is not charged.

Timely Information of the user: The system provides information for each hoist apparatus such as its serial number, last and next maintenance, log of activity, person assigned with the equipment and current worksite assigned. This information allows for a more efficient management of the hoist apparatuses.

The monitoring device can use many protocols for communications, either local i.e. BLUETOOTH®, or remote i.e. GSM®. Message transmission may for example use low power and low data rate that are used around the world for different vertical solutions under the IoT concept. Preferably it uses GSM® or equivalents and for example multicarrier 3G using a SIM card that may give access to worldwide service. Also, preferably, a BLUETOOTH® device for local DATA transmission is integrated in the monitoring device. Still preferably, a NFC® bidirectional sensor is in the top internal face of the case to activate several functionalities for ID and access protocols.

Regarding the transmitted data, and other possible information and identification, it is transmitted to a cloud server, the machine learning inside cloud services, all used algorithms and the interpretation of the information is done by a cloud and native application in order to have a passive monitoring device that is really simple.

A GPS is integrated in the monitoring device. It works for providing the location of the monitoring device depending on the available and visible satellites.

The monitoring device includes at least the following components:

PLASTIC ENCLOSURE: The monitoring device enclosure is made of plastic. Preferably, the plastic is a combination of Acrylonitrile Styrene Acrylate and Polycarbonate (ASA/PC) such as Luran® S KR2863C. In other embodiments, Acrylonitrile Styrene Acrylate (ASA) such as Luran® S 778 T UV may be used. These are injection molding grade materials with increased heat deflection temperature, specially used for automotive parts. This thermoplastic is an alternative to acrylonitrile butadiene styrene (ABS), but with improved weather and UV resistance, and the best mechanical properties for the monitoring device conditions of use. The monitoring device case has a high and essentially constant rigidity in the temperature range between -20 and 80° C. It is also stable to the outdoor weathering without any change of its mechanical properties of the combination of UV radiation, atmospheric oxygen and heat. The monitoring device case has a chemical structure exceptionally stable that avoids the yellowing effect, even after 4000 hours of outdoor weathering (2 years) thanks to its UV stabilizer. The monitoring device case material has a convenient antistatic performance at normal atmospheric humidity levels, because it has the advantage that dust marks do not form on the case during manufacture or storage or in use. High electrical charges applied to the surface of the monitoring device case, dissipate rapidly. The monitoring device case fire performance according to UL 94 and DIN IEC 707/VDE 0304 Part 3, "Test methods for determining the flammability under the action of igniting sources" is shown in the following chart. The material has been tested according to "Supplement to DIN 4102-Fire performance of building materials and building components". Flat samples of the material of thickness of 1.0 mm and above are generally rated B2 ("building materials of normal flammability") according to this standard. Further, they are normally rated as "not forming burning droplets". For applications in automotive construction, the requirements of MVSS 302 and/or DIN 75200 must be met. Flat specimens of the same material in thicknesses of 1 mm and above fulfill these requirements. The enclosure can have only vertical peripheral walls (as on FIG. 1) or may have in addition top and/or bottom and/or intermediate horizontal continuous or not slab(s).

PCB: The printed circuit board of the monitoring device is the one that mechanically supports the electronic components and connect those using conductive tracks through the two layers. Bottom layer is mainly for the tracks that are to be connected to the electric wiring of the control box of the hoist apparatus. The top layer connects the electronic components, such as the accelerometer, proximity communication device/sensor such as BLUETOOTH® and/or NFC®, battery charger, voltmeter and ammeter to the microcontroller. The monitoring device PCB is manufactured with lead-free base material and all the process while manufacturing has been lead-free processes in order to fulfill the RoHS Directive standard of the European Union. As others printed circuits, the printed circuit is manufactured by curing under pressure and temperature layers of cloth with thermoset resin to form an integral final piece of uniform thickness that will be supported on 6 vibration isolator dampers that are bolted to the internal rib of the monitoring device enclosure.

MICROCONTROLLER: The microcontroller of the monitoring device is programmed to receive the data from the sensors, detectors and switches of the circuit. The data needs to be classified and packaged to be sent to a SYRIUS® router and then to a PEGASUS® Gateway by the GSM® technology. It is translated into useful information by the algorithms corresponding to the processes implemented in the processor of the remote application and displayed in the front-end environment to the user. The microcontroller is upgraded over-the-air. It means that any updating process of the firmware can be easily modified remotely. This is for the PCB microcontroller and the SYRIUS® circuit.

COMMUNICATION DEVICES: A module, the SYRIUS® SL3G-1645 by DCT®, is used as a router device for the monitoring device to transmit data to the PEGASUS® Gateway. It is an intelligent tracking hub with expanded interoperability successfully used for fleet automation. This unit has both: 2G Quad-band & 3G Penta-Band GSM/GPRS modules with superior GPS sensitivity. Its key features include: motion, shock and aggressive driving detection, acceleration backlog and an ultra-low power consumption. It has embedded GSM® and GPS antennas with superior cellular and GPS quality. It must be understood that the electronic devices and solutions that are listed in this specification are given as examples and others with simplified, identical or similar or improved functionalities may be used instead.

BATTERY: The monitoring device includes a standard rechargeable Li-ion battery pack of 6×18650 cells (3S2P) with 11.25V/6400 mAh/72.0 Wh.

Electrical Relays or sensors: The monitoring device is monitoring the electrical control box of the hoist apparatus through the transformation of the high power or high voltage circuits (110V 1 ph; 220V 1 ph; 220V 2 ph; 220V 3 ph; 400-490V, 3 ph) of the hoist apparatus into the low voltage input circuit of the monitoring device. Several electromechanical or current sensing relays or sensors can be implemented in the hoist apparatus, at least, for example, a bimetallic strip relay, a phase reversal detector or other safety and operational relays or sensors in the high-power circuit of the hoist apparatus to send the necessary pulses to the microcontroller of the low voltage input circuit of the monitoring device to activate any of its monitoring functionalities or alarms SUBMINIATURE SWITCHES: The monitoring device case has two subminiature switches which activate anti-tampering alarms. The first is to detect the removal of the top cover of the box once the monitoring device has been installed in the box of the control box of the hoist apparatus and the second is to detect the monitoring device enclosure removal from the box.

Optional AC/DC Power Inlet (Receptacle 22 on FIG. 2)

The management system operates thanks to computer programs and the backend functionalities of the remote software application includes inventory managing, logistics and identification procedures for the entire hoist apparatus and its traceability. The PEGASUS® gateway by DCT enables the communication of the monitoring device with the application by its developed API's. The SYRIUS® is the GSM/GPS router that provides the technology for data transmission. The application is hosted and all the data that is generated and transmitted by the monitoring device is stored in a reliable and secure server. One uses Web Services that provide Data learning algorithms and machine learning.

On FIG. 1, an example of enclosure 20 of the monitoring device is visible. It is shaped to fit sandwiched between the sidewalls and the removable lid closing the box 10 of the control box 14 of the hoist apparatus 1. As the box is rectangular in section, the enclosure is also rectangular in section in order to have the peripheral walls of the enclosure to be in the continuation of the sidewalls. The enclosure is also shaped to receive the removable lid of the box. Four stainless steel special bolts that pass through four fixation holes 21 through the peripheral walls of the enclosure of the monitoring device are used to secure the enclosure sandwiched in the box of the control box.

The monitoring device 2 sandwiched in the box 10 of the control box 14 of the hoist apparatus 1 is visible on FIG. 3 and it can be seen that the resulting control box is still a tight case. The enclosure of FIG. 1 has a hole 27 in one of its peripheral walls, intended to receive a socket 22 (FIG. 2) for a main power supply plug.

The hoist apparatus 1 of FIG. 3 comprises an electric motor 11, a gearbox 12 that are arranged on a base 13. The control box 14 is fitted with the enclosure of the monitoring device 2 on FIG. 1 and the lid (not visible on FIG. 1) of the box is also closing the enclosure 20. It is clear that, when the monitoring device 2 is not fitted in the box, the box 10 of the control box will be directly closed by the lid.

In the example of FIG. 2, the enclosure 20 has no partition slab and the content of the enclosure 20 is visible at least in part. On FIG. 2 it can be seen inside the enclosure 20: rechargeable batteries 23, communication devices/circuits 25, a printed circuit board (PCB) 24 a tampering switch 26 dedicated to the detection of the opening of the lid. In relation to the hole 27 of FIG. 1, a socket 22 for main power supply is visible on FIG. 2.

The schematic representation on FIG. 4 of the hardware, software, functions and relations of the elements gives a better insight into the capabilities of a management system for hoist apparatuses equipped with monitoring devices according to the invention. On the left side, are represented elements and functions related to the local monitoring device: the hoist apparatus 1 with the monitoring device comprising a microcontroller, sensors, a printed circuit board (PCB) a temporary buffer for memorizing/storing data or other information and also the related firmware 27. The sensors and detectors devices and functions are listed in box 28. Power supply though main 30 or dedicated alternative power supply 30' through a specific connector are represented in relation to the recharging system 32 connected to the batteries 23. The batteries allow as a result or outcome an operational autonomy.

On the right of the above-mentioned elements are the main functions with the communications that are:
local/proximity 32 with NFC® and allowing as a result or outcome access control,
remote with wireless communication 33 toward a mobile phone 4 having a mobile application adapted to the management system and allowing communications with the cloud and a back-end software on servers of the cloud. This allows as a result or outcome the management of traceability, inventory control and the real time wireless monitoring. The remote (from the hoist apparatus) part 7 of the management system using wireless communication has been delimited by dashed lines on FIG. 4.
remote with GSM® (or equivalent) communication 34 directly toward the cloud and web software and data analysis and expert system toward users. The remote (from the hoist apparatus) part 6 of the management system using GSM® communication has been delimited by dashed lines on FIG. 4. This allows as a result or outcome the predictive maintenance and all the other capabilities based on the data management such as for example the fleet management, preventive maintenance.

Finally, the GPS 35 system in relation to GPS satellites is in the monitoring device 2.

The invention claimed is:
1. Hoist apparatus (1) that can be moved, comprising:
an electric motor (11),
a control box (14) that can be electrically powered by a power supply, the control box comprising at least an electronic control circuit, an electrical wiring and an external casing forming a box (10) of the control box (14), said external casing comprising at least sidewalls and a removable lid closing the box, the control box (14) controlling the operations of the electric motor thanks to the electrical wiring connected to the electronic control circuit, to the power supply and to the electric motor, the electric motor (11) being outside the control box (14), and
a monitoring device (2),
wherein the monitoring device comprises a geo-location system and is an insert of the box, the monitoring device being arranged within an enclosure (20), the enclosure (20) being an added part of the box or being an exchanged part of the box and wherein the monitoring device (2) is connected to the electrical wiring,
wherein the electrical wiring has an internal part that is located within the control box and the monitoring device is connected to the internal part of the electrical wiring, and
wherein the monitoring device further comprises:
a system of communication allowing at least the transmission of information,
a system for collecting data,
a system for comparing at least some of the data to reference values, and
a system for executing actions according to the result of the comparison, said actions being at least to allow the transmission of information.

2. The hoist apparatus according to claim 1, wherein the enclosure (20) is an added part of the box (10) and the monitoring device (2) is arranged within an enclosure (20) having at least peripheral walls, the enclosure (20) being sandwiched between the lid and the sidewalls of the box (10), the enclosure being shaped for the peripheral walls being in the continuation of shape of the sidewalls.

3. The hoist apparatus according to claim 1, wherein the enclosure is an exchanged part of the box (10) and the monitoring device (2) is arranged within an enclosure that forms a new lid of the box (10).

4. The hoist apparatus according to claim 1, wherein the monitoring device (2) is a plug and play device that is removable from the box (10).

5. The hoist apparatus according to claim 1, wherein the monitoring device (2) comprises following elements:
a programmed computing device,
a real clock timer providing time data,
a circuit to detect the presence and absence of the power supply and provide related data, a circuit to detect the operations of the electric motor and provide related data,
a circuit to detect the movements of the hoist apparatus and provide movement data,
a geo location device to provide geolocation data,
a memory circuit to memorize data, said memorized data being at least data in relation to the presence of the power supply and to the operations of the electric motor, at least some of said data being time stamped by the time data of the real clock timer, said memory circuit being readable,
a wireless circuit for the system of communication, said wireless circuit allowing at least the transmission of information, said information being at least datum or data provided by the elements of the monitoring device and/or memorized datum or data, and wherein the programmed computing device is configured to compare at least some of the data to reference values and to execute actions according to the result of the comparison, said actions being at least to allow the transmission of information.

6. The hoist apparatus according to claim 1, wherein the system of communication is further able to receive instructions to command a programmed computing device of the monitoring device.

7. The hoist apparatus according to claim 5, wherein the system of communication and notably the wireless circuit are further able to receive instructions to command the programmed computing device of the monitoring device.

8. The hoist apparatus according to claim 5, wherein the wireless circuit is at least one from the mobile phone type and the proximity communication type.

9. The hoist apparatus according to claim 5, wherein the circuit to detect the movements of the hoist apparatus is at least one selected from an accelerometer and the use of geolocation data provided by the geolocation device, a change of the geolocation data over the time providing a detection of movement.

10. The hoist apparatus according to claim 5, wherein the programmed computing device is configured to compare a current geolocation data to geolocation reference values corresponding to points of a virtual fence around an authorized location of the hoist apparatus and to allow the transmission of an information that is an overfence alarm when the current location is outside the virtual fence.

11. The hoist apparatus according to claim 5, wherein the monitoring device further comprises one or more of the following elements:
a tampering detector providing tampering data in case the lid is opened and the programmed computing device is configured to allow the transmission of an information that is a tampering alarm when the lid is opened,
a removal detector providing removal data in case the monitoring device is removed from the control box, and the programmed computing device is configured to allow the transmission of an information that is a removing alarm when the monitoring device is removed,
a tilting detector providing tilting data in case the hoist apparatus is tilted over a maximum angle of tilting, and the programmed computing device is configured to allow the transmission of an information that is a tilting alarm when the hoist apparatus is tilted over the maximum angle of tilting,
a vibration detector providing vibration data and the programmed computing device is configured to allow the transmission of an information that is a vibration alarm when the vibration data is over a vibration reference value,
a circuit to detect the presence and absence of the power supply further measuring voltage and/or current and provide related data,
a circuit to detect the operations of the electric motor further measuring voltage and/or current and provide related data,
a proximity communication device,
a thermometer to detect the temperature of the electric motor case and provide related data.

12. The hoist apparatus according to claim 1, wherein the control box is further connected to an electric command line terminated with a pendant command panel allowing an operator to select operations of the hoist apparatus and wherein the monitoring device is connected to the electric command line and wherein the monitoring device further comprises a circuit to detect the operations selected by the operator on the pendent command panel and provide related data.

13. Monitoring device (2) specifically configured for the hoist apparatus of claim 1, said hoist apparatus comprising said electric motor and said control box (14) that can be electrically powered by said power supply, the control box comprising an electronic control circuit, an electrical wiring and an external casing forming the box (10) of the control box (14), said external casing comprising at least sidewalls and a removable lid closing the box, the control box controlling the operations of the electric motor thanks to the electrical wiring connected to the electronic control circuit, to the power supply and to the electric motor, wherein the monitoring device (2) is arranged within an enclosure (20) having at least peripheral walls, the enclosure (20) being configured to be sandwiched between the lid and the sidewalls of the box (10), the enclosure being shaped for the peripheral walls being in the continuation of shape of the sidewalls, and
wherein the monitoring device is configured to be connected to the electrical wiring, the electrical wiring having an internal part that is located within the control box and the monitoring device being connected to the internal part of the electrical wiring,
wherein the monitoring device comprises:
said geo-location system,
said system of communication allowing at least the transmission of information,
said system for collecting data,
said system for comparing at least some of the data to reference values, and
said system for executing actions according to the result of the comparison, said actions being at least to allow the transmission of information.

14. Management system comprising a set of hoist apparatuses according to claim 1, at least a server on a cloud that can communicate with the hoist apparatuses and a management application.

15. The hoist apparatus according to claim 2, wherein the monitoring device (2) is a plug and play device that is removable from the box (10).

16. The hoist apparatus according to claim 3, wherein the monitoring device (2) is a plug and play device that is removable from the box (10).

* * * * *